(12) United States Patent
Kamoshida et al.

(10) Patent No.: US 9,732,996 B2
(45) Date of Patent: Aug. 15, 2017

(54) EVAPORATOR WITH COOL STORAGE FUNCTION

(75) Inventors: Osamu Kamoshida, Oyama (JP); Naohisa Higashiyama, Oyama (JP)

(73) Assignee: KEIHIN THERMAL TECHNOLOGY CORPORATION, Oyama-Shi (JP)

( * ) Notice: Subject to any disclaimer, the term of this patent is extended or adjusted under 35 U.S.C. 154(b) by 207 days.

(21) Appl. No.: 13/597,475

(22) Filed: Aug. 29, 2012

(65) Prior Publication Data
US 2013/0047663 A1 Feb. 28, 2013

(30) Foreign Application Priority Data

Aug. 31, 2011 (JP) .................................. 2011-188215

(51) Int. Cl.
| | | |
|---|---|---|
| *F25B 39/02* | (2006.01) | |
| *B60H 1/00* | (2006.01) | |
| *F28D 1/053* | (2006.01) | |
| *F28D 20/02* | (2006.01) | |

(52) U.S. Cl.
CPC ............ *F25B 39/02* (2013.01); *B60H 1/005* (2013.01); *B60H 1/00335* (2013.01); *F28D 1/05391* (2013.01); *F28D 20/02* (2013.01); *F25B 2400/24* (2013.01); *Y02E 60/145* (2013.01)

(58) Field of Classification Search
CPC .................................... F28D 3/02; F28D 3/025
USPC .... 62/406, 430, 436, 516, 519, 524; 165/10, 165/165, 166
See application file for complete search history.

(56) References Cited

U.S. PATENT DOCUMENTS

| | | | | |
|---|---|---|---|---|
| 5,644,929 A | * | 7/1997 | Tanaka et al. | 62/406 |
| 7,686,070 B2 | * | 3/2010 | Chu et al. | 165/109.1 |
| 2011/0154855 A1 | * | 6/2011 | Sasaki et al. | 62/524 |

FOREIGN PATENT DOCUMENTS

| | | | | |
|---|---|---|---|---|
| JP | 59-103072 | * | 12/1984 | ................ F28F 1/08 |
| JP | 09292196 A | * | 11/1997 | ............. F28F 9/013 |
| JP | 2011-012947 A | | 1/2011 | |

(Continued)

OTHER PUBLICATIONS

Notice of Reasons for Rejection dated Apr. 28, 2015 issued for corresponding Japanese Patent Application No. 2011-188215.

(Continued)

*Primary Examiner* — Jianying Atkisson
*Assistant Examiner* — Antonio R Febles
(74) *Attorney, Agent, or Firm* — Mori & Ward, LLP (57) ABSTRACT

An evaporator with a cool storage function includes flat refrigerant flow tubes, a cool storage material container disposed in at least one of all air-passing clearances each formed between adjacent refrigerant flow tubes, and an inner fin disposed in the cool storage material container. Each of left and right side walls of the cool storage material container has a contact portion in contact with the inner fin and a noncontact portion not in contact with the inner fin. In an overlap region where the left and right side walls of the cool storage material container overlap with the corresponding refrigerant flow tubes when the container is viewed from the left side or right side thereof, the area of the contact portion of each of the left and right side walls is greater than the area of the noncontact portion of each of the left and right side walls.

9 Claims, 10 Drawing Sheets

(56) References Cited

FOREIGN PATENT DOCUMENTS

| | | |
|---|---|---|
| JP | 2011-099632 | 5/2011 |
| JP | 2011-149684 A | 8/2011 |

OTHER PUBLICATIONS

Japanese Office Action for corresponding JP Application No. 2011-188215, Sep. 29, 2015.

* cited by examiner

EVAPORATOR WITH COOL STORAGE FUNCTION

BACKGROUND OF THE INVENTION

The present invention relates to an evaporator with a cool storage function for use in a car air conditioner for a vehicle in which an engine serving as a drive source for a compressor is temporarily stopped when the vehicle is stopped.

Figure 1:
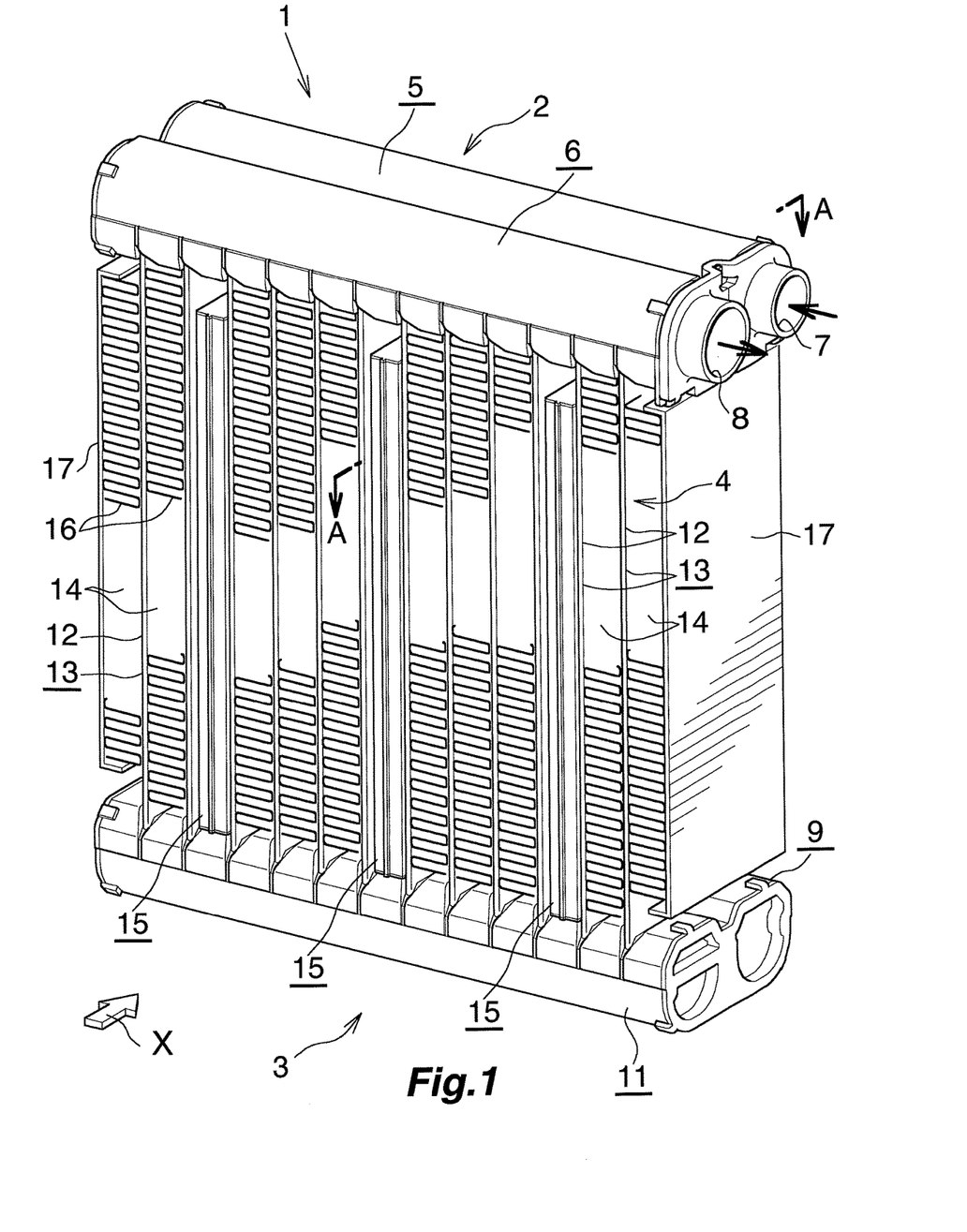
FIG. 1 is a partially cut-away perspective view showing the overall structure of an evaporator with a cool storage function according to the present invention.
Figure 3:
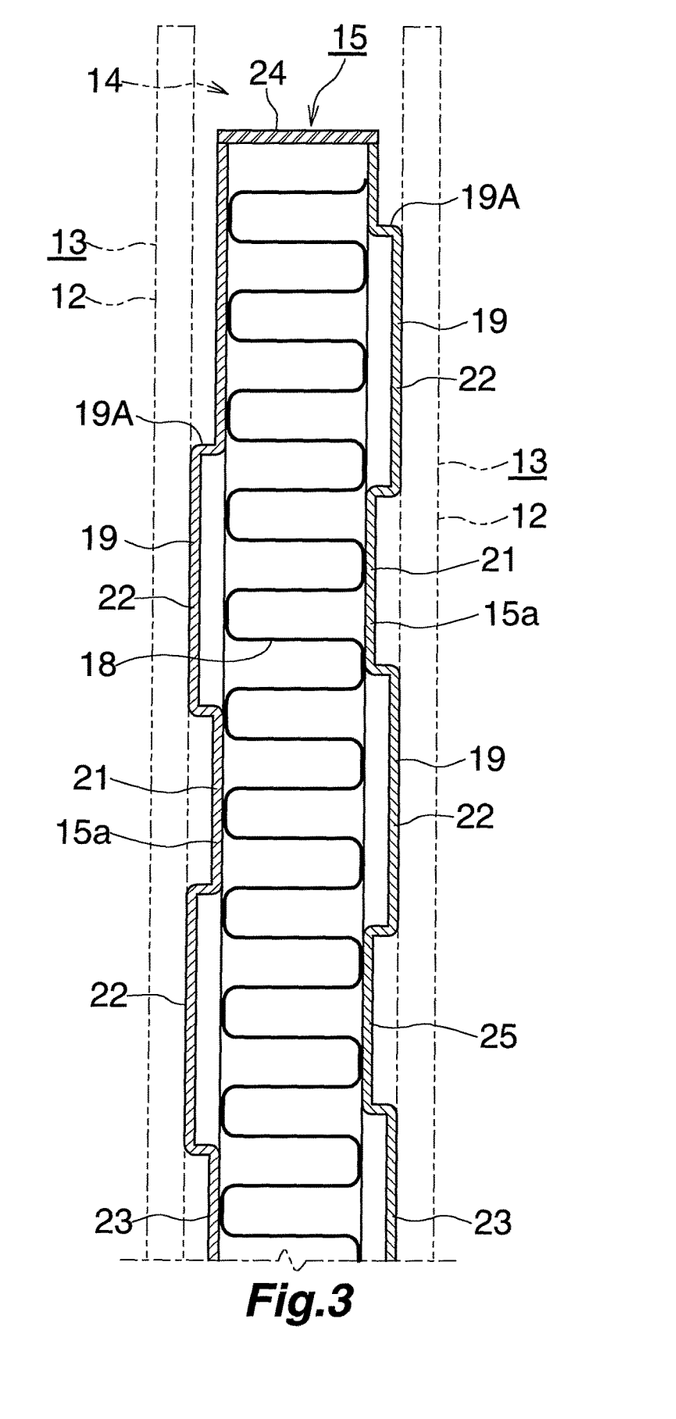
FIG. 3 is a sectional view taken along line B-B of FIG. 2.
Figure 8:
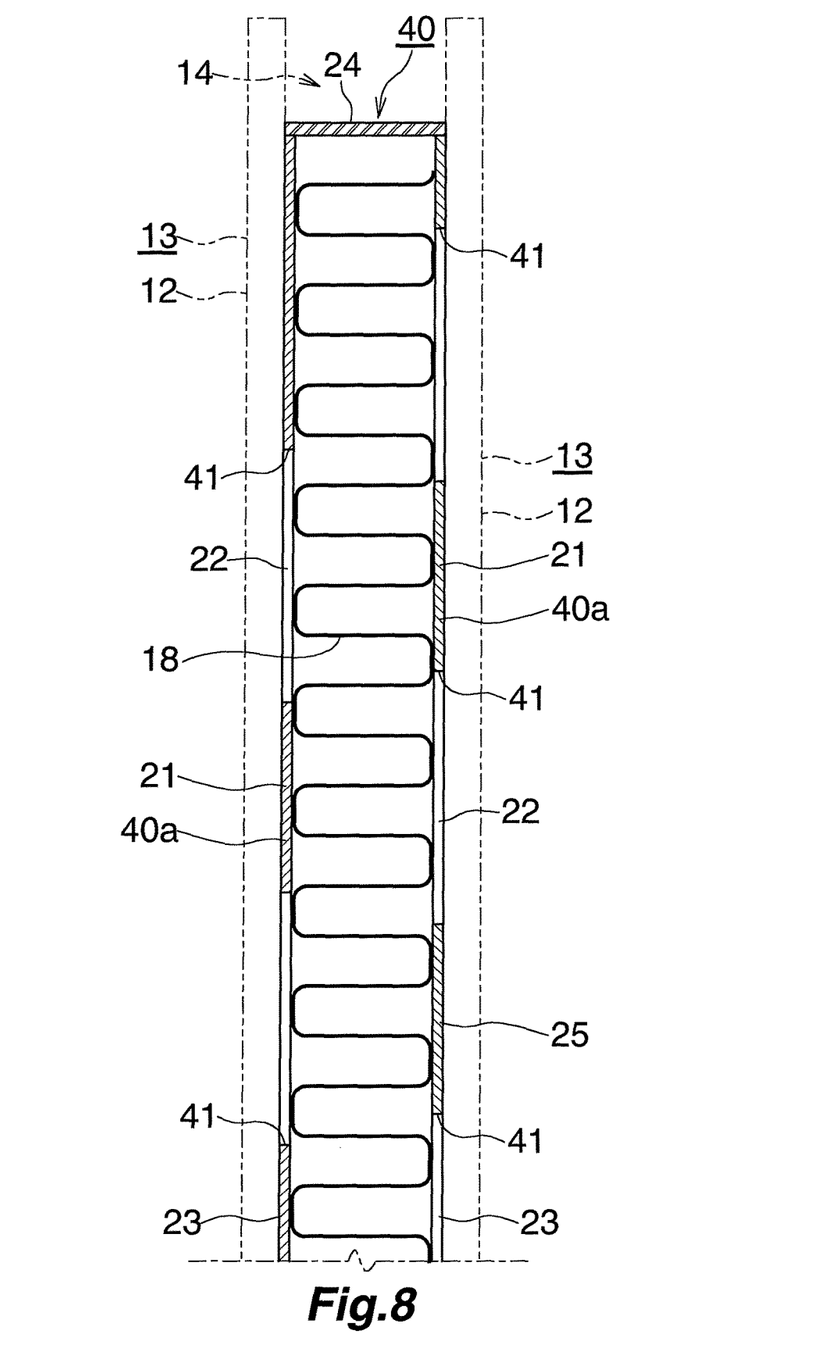
FIG. 8 is a view corresponding to FIG. 3 and showing the cool storage material container of FIG. 7.

In the present specification and appended claims, the upper, lower, left-hand, and right-hand sides of FIGS. 1, 3, and 8 will be referred to as "upper," "lower," "left," and "right," respectively.

In recent years, in order to protect the environment and improve fuel consumption of automobiles, there has been proposed an automobile designed to automatically stop the engine when the automobile stops, for example, so as to wait for a traffic light to change.

However, an ordinary car air conditioner has a problem in that, when an engine of an automobile in which the air conditioner is mounted is stopped, a compressor driven by the engine is stopped, and supply of refrigerant to an evaporator stops, whereby the cooling capacity of the air conditioner sharply drops.

As one measure to solve such a problem, imparting a cool storage function to the evaporator has been considered, to thereby enable cooling of a vehicle compartment by releasing the cool stored in the evaporator, when the compressor stops as a result of stoppage of the engine.

An evaporator with a cool storage function has been proposed (see Japanese Patent Application Laid-Open (kokai) No. 2011-12947). In the proposed evaporator, a plurality of flat refrigerant flow tubes which extend in the vertical direction and whose width direction coincides with an air-passing direction are disposed in parallel such that they are spaced from one another. The evaporator has air-passing clearances each formed between refrigerant flow tubes located adjacent to each other. Cool storage material containers filled with a cool storage material are disposed in some air-passing clearances, and outer fins are disposed in the remaining air-passing clearances. The outer fins are disposed in the air-passing clearances adjacently located on opposite sides of each air-passing clearance in which the corresponding cool storage material container is disposed. Each cool storage material container includes an inner fin disposed therein. A plurality of convex portions which bulge outward are formed on each of the left and right side walls of the cool storage material container such that each side wall is studded with the convex portions. The bulging top walls of the convex portions are in contact with the corresponding refrigerant flow tube. The convex portions of one side wall of each cool storage material container are identical in shape and size with the convex portions of the other side wall of the cool storage material container, and are provided at the same locations as those of the convex portions of the other side wall as viewed from the left side or the right side. The inner fin is joined to portions of the left and right side walls of the cool storage material container where the convex portions are not formed. As viewed from the left side or the right side, the portions of the left and right side walls of the cool storage material container where the convex portions are not formed are contact portions which are in contact with the inner fin, and the portions of the left and right side walls which correspond to the bulging top walls of the convex portions are noncontact portions which are not in contact with the inner fin.

The evaporator with a cool storage function disclosed in the publication operates as follows. In an ordinary cooling period in which a compressor is operating, the cool carried by the refrigerant flowing through the refrigerant flow tubes is transferred directly to the cool storage material within each cool storage material container from the bulging top walls of the convex portions of the two side walls of the cool storage material container, the bulging top walls being the noncontact portions of the two side walls which are not in contact with the inner fin and which are in contact with the corresponding refrigerant flow tubes. Also, the cool carried by the refrigerant is transferred from the contact portions of the two side walls, which are in contact with the inner fin, to the cool storage material in the cool storage material container via the inner fin. Thus, the cool is stored in the cool storage material. Meanwhile, when the compressor stops, the cool stored in the cool storage material within each cool storage material container is transferred directly to the two side walls of the cool storage material container, or is transmitted from the inner fin to the two side walls of the cool storage material container through the contact portions which are in contact with the inner fin. Subsequently, the cool is transferred to the corresponding refrigerant flow tubes through the bulging top walls of the convex portions. The cool is then transferred through the refrigerant flow tubes to the outer fins disposed in the air-passing clearances adjacently located on the opposite sides of the air-passing clearance in which the cool storage material container is disposed. Subsequently, the cool is released from the outer fins to air flowing through the air-passing clearances.

However, the evaporator with a cool storage function disclosed in the publication has the following problem. In the disclosed evaporator, the convex portions of one side wall of each cool storage material container are identical in shape and size with the convex portions of the other side wall of the cool storage material container, and are provided at the same locations as those of the convex portions of the other side wall as viewed from the left side or the right side. The portions of the left and right side walls of the cool storage material container where the convex portions are not formed are contact portions which are in contact with the inner fin, and the bulging top walls of the convex portions are noncontact portions which are not in contact with the inner fin. Therefore, in an overlap region where the left and right side walls of each cool storage material container overlap with the corresponding refrigerant flow tubes as viewed from the left side or right side of the cool storage material container, the total area of the contact portions of each of the left and right side walls of each cool storage material container which are in contact with the inner fin is smaller than the total area of the noncontact portions thereof which are not in contact with the inner fin. Accordingly, in both the period during which cool is stored and the period during which cool is released, the efficiency of heat transfer between the left and right side walls of each cool storage material container and the cool storage material stored therein, which transfer is performed through utilization of the inner fin is not sufficiently high. Therefore, the conventional evaporator is unsatisfactory in terms of cool storage performance and cool release performance.

SUMMARY OF THE INVENTION

An object of the present invention is to solve the above-mentioned problem and to provide an evaporator with a cool storage function which has improved cool storage performance and cool release performance.

To fulfill the above object, the present invention comprises the following modes.

1) An evaporator with a cool storage function in which a plurality of vertically extending flat refrigerant flow tubes are disposed in parallel such that their width direction coincides with an air-passing direction and they are spaced from one another, air-passing clearances are formed such that each air-passing clearance is provided between adjacent refrigerant flow tubes, a cool storage material container filled with a cool storage material is disposed in at least one of the air-passing clearances, and an inner fin is disposed in the cool storage material container, wherein each of left and right side walls of the cool storage material container has a contact portion which is in contact with the inner fin and a noncontact portion which is not in contact with the inner fin; and in an overlap region where the left and right side walls of the cool storage material container overlap with the corresponding refrigerant flow tubes when the cool storage material container is viewed from the left side or right side thereof, the contact portion of each of the left and right side walls of the cool storage material container has an area greater than that of the noncontact portion of each of the left and right side walls.

2) An evaporator with a cool storage function according to par. 1), wherein a plurality of the noncontact portions are provided such that each of the left and right side walls of the cool storage material container is studded with the noncontact portions; and at least some of the noncontact portions of one side wall of the cool storage material container are shifted from the corresponding noncontact portions of the other side wall of the cool storage material container as viewed from the left side or right side of the cool storage material container.

3) An evaporator with a cool storage function according to par. 1), wherein a plurality of outwardly bulging convex portions are formed on each of the left and right side walls of the cool storage material container such that each of the side walls is studded with the convex portions, and bulging top walls of the convex portions are in contact with the corresponding refrigerant flow tubes; and as viewed from the left side or right side of the cool storage material container, portions of each of the left and right side walls of the cool storage material container where the convex portions are not formed serve as the contact portion which is in contact with the inner fin, and portions of each of the left and right side walls which correspond to the bulging top walls of the convex portions serve as the noncontact portion which is not in contact with the inner fin.

4) An evaporator with a cool storage function according to par. 3), wherein at least some of the convex portions of one side wall of the cool storage material container are shifted from the corresponding convex portions of the other side wall of the cool storage material container as viewed from the left side or right side of the cool storage material container.

5) An evaporator with a cool storage function according to par. 1), wherein the left and right side walls of the cool storage material container are joined to the corresponding refrigerant flow tubes;

through-holes are formed in portions of the left and right side walls of the cool storage material container which portions are joined to the corresponding refrigerant flow tubes; and as viewed from the left side or right side of the cool storage material container, portions of each of the left and right side walls of the cool storage material container where the through-holes are not formed serve as the contact portion which is in contact with the inner fin, and portions of each of the left and right side walls of the cool storage material container where the through-holes are formed serve as the noncontact portion which is not in contact with the inner fin.

6) An evaporator with a cool storage function according to par. 5), wherein at least some of the through-holes of one side wall of the cool storage material container are shifted from the corresponding through-holes of the other side wall of the cool storage material container as viewed from the left side or right side of the cool storage material container.

7) An evaporator with a cool storage function according to par. 1), wherein the inner fin has an offset shape, and is formed by a plurality of corrugated strips which are arranged in the air-passing direction and integrally connected together, each of the corrugated strips having crest portions extending in the air-passing direction, trough portions extending in the air-passing direction, and connection portions connecting the crest portion and the trough portion; and the crest portions and the trough portions of one of two strips adjacent to each other in the air-passing direction are positionally shifted in the vertical direction from those of the other strip.

8) An evaporator with a cool storage function according to par. 1), wherein the inner fin has a corrugated shape, and has crest portions extending in the air-passing direction, trough portions extending in the air-passing direction, and connection portions connecting the crest portion and the trough portion.

9) An evaporator with a cool storage function according to par. 1), wherein outer fins are disposed in air-passing clearances adjacent to the air-passing clearance in which the cool storage material container is disposed.

According to the evaporator with a cool storage function of any one of pars. 1) to 9), each of left and right side walls of the cool storage material container has a contact portion which is in contact with the inner fin and a noncontact portion which is not in contact with the inner fin; and in an overlap region where the left and right side walls of the cool storage material container overlap with the corresponding refrigerant flow tubes when the cool storage material container is viewed from the left side or right side thereof, the area of the contact portion of each of the left and right side walls of the cool storage material container is greater than the area of the noncontact portion of each of the left and right side walls. Therefore, as compared with the evaporator with a cool storage function disclosed in the above-mentioned publication, the performance of heat transfer between the left and right side walls of the cool storage material container and the cool storage material via the inner fin becomes excellent in both the period during which cool is stored and the period during which cool is released. Accordingly, the cool storage performance and the cool release performance can be improved as compared with the evaporator with a cool storage function disclosed in the above-mentioned publication.

According to the evaporator with a cool storage function of any one of pars. 3) to 6), the following advantageous effect is achieved. Through use of a relatively simple structure, it becomes possible to enable each of left and right side walls of the cool storage material container to have a contact portion which is in contact with the inner fin and a noncontact portion which is not in contact with the inner fin. Also, in an overlap region where the left and right side walls of the cool storage material container overlap with the corresponding refrigerant flow tubes when the cool storage material container is viewed from the left side or right side thereof, the area of the contact portion of each of the left and right side walls of the cool storage material container, which portion is in contact with the inner fin, can be made greater than the area of the noncontact portion of each of the left and right side walls, which portion is not in contact with the inner fin.

According to the evaporator with a cool storage function of any one of pars. 3) and 4), the following advantageous effect is achieved. Even in the air-passing clearance in which the cool storage material container is disposed, due to presence of the convex portions, clearances are formed between the refrigerant flow tubes and the cool storage material container, and air flows through the clearances. Accordingly, an increase in air passage resistance can be suppressed. Also, the presence of the convex portions enables condensed water produced on the outer side surfaces of the refrigerant flow tubes to be drained through the clearances formed between the refrigerant flow tubes and the cool storage material container due to the presence of the convex portions.

According to the evaporator with a cool storage function of any one of pars. 5) and 6), the following advantageous effect is achieved. In the case where the refrigerant flow tubes and the cool storage material container are brazed together, the brazing area therebetween becomes smaller than that in the case where through-holes are not formed. Accordingly, the clearance—which is produced between one side of the corresponding refrigerant flow tube and the outer surface of the cool storage material container because the brazing between the two members is not performed completely over the entire surface—becomes smaller than that in the case where through-holes are not formed, and the amount of condensed water which enters the clearance also decreases. As a result, it is possible to prevent a large amount of condensed water from stagnating in the spaces between the refrigerant flow tubes and the cool storage material container and to prevent the condensed water from freezing. Thus, separation of the entire cool storage material container from the refrigerant flow tubes can be prevented for a long period of time. Moreover, at the portions of each side wall of the cool storage material container where the through-hole are formed, the cool storage material within the cool storage material container is cooled, only through the walls of the refrigerant flow tubes, by the refrigerant flowing through the refrigerant flow tubes. Therefore, the efficiency of the operation of cooling the cool storage material within the cool storage material container can be improved.

DESCRIPTION OF THE PREFERRED EMBODIMENT

An embodiment of the present invention will next be described with reference to the drawings.

In the following description, the downstream side with respect to an air-passing direction (a direction represented by arrow X in FIGS. 1, 2, 4, 6, 7, and 9) will be referred to as the "front," and the opposite side as the "rear."

Furthermore, the term "aluminum" as used in the following description encompasses aluminum alloys in addition to pure aluminum.

FIG. 1 shows the overall configuration of an evaporator with a cool storage function according to the present invention, and FIGS. 2 to 5 show the configuration of an essential portion of the evaporator.

As shown in FIG. 1, an evaporator with a cool storage function 1 includes a first header tank 2 and a second header tank 3 formed of aluminum and disposed apart from each other in the vertical direction such that they extend in the left-right direction; and a heat exchange core section 4 provided between the two header tanks 2 and 3.

The first header tank 2 includes a leeward upper header section 5 located on the front side (downstream side with respect to the air-passing direction); and a windward upper header section 6 located on the rear side (upstream side with respect to the air-passing direction) and united with the leeward upper header section 5. A refrigerant inlet 7 is provided at the right end of the leeward upper header section 5, and a refrigerant outlet 8 is provided at the right end of the windward upper header section 6. The second header tank 3 includes a leeward lower header section 9 located on the front side, and a windward lower header section 11 located on the rear side and united with the leeward lower header section 9. The respective interiors of the leeward lower header section 9 and the windward lower header section 11 of the second header tank 3 are connected together via an unillustrated proper means.

Figure 2:
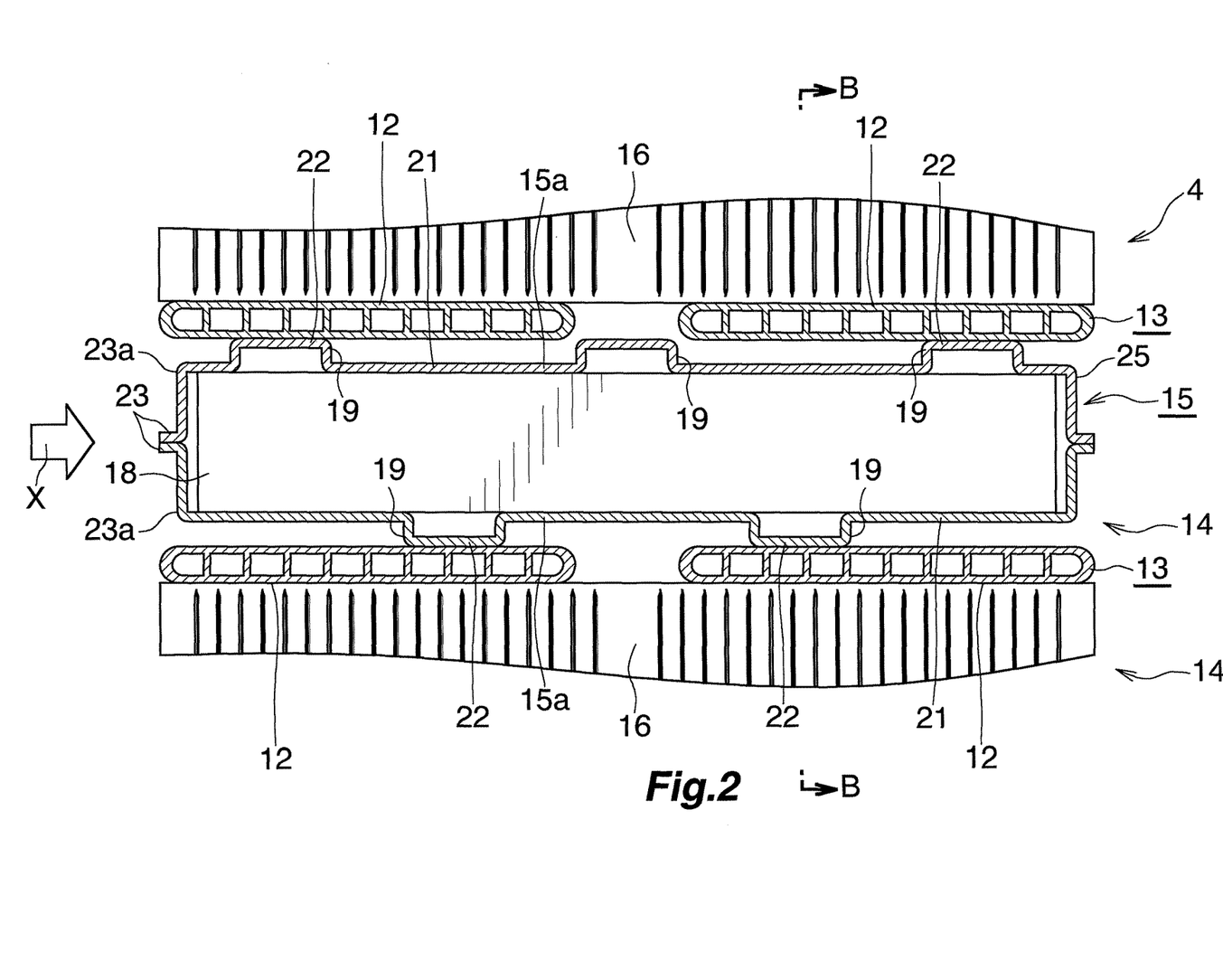
FIG. 2 is an enlarged sectional view taken along line A-A of FIG. 1.

As shown in FIGS. 1 and 2, in the heat exchange core section 4, a plurality of flat refrigerant flow tubes 12 which extend in the vertical direction, whose width direction coincides with the air-passing direction (the front-rear direction), and which are formed of aluminum extrudate are disposed in parallel such that they are spaced from one another in the left-right direction. In the present embodiment, a plurality of pairs 13 each composed of two refrigerant flow tubes 12 spaced from each other in the front-rear direction are disposed at predetermined intervals in the left-right direction. An air-passing clearance 14 is formed between adjacent two of the pairs 13 each composed of the front and rear refrigerant flow tubes 12. An upper end portion of each front refrigerant flow tube 12 is connected to the leeward upper header section 5, and a lower end portion of each front refrigerant flow tube 12 is connected to the leeward lower header section 9. Similarly, an upper end portion of each rear refrigerant flow tube 12 is connected to the windward upper header section 6, and a lower end portion of each rear refrigerant flow tube 12 is connected to the windward lower header section 11.

A cool storage material container 15 which is formed of aluminum and which is filled with a cool storage material (not shown) is disposed in each of air-passing clearances 14 selected from all the air-passing clearances 14 of the heat exchange core section 4, the selected passing clearances 14 being not adjacent from one another, such that the cool storage material container 15 extends over the front and rear refrigerant flow tubes 12. Also, a corrugated outer fin 16—which is formed from an aluminum brazing sheet having a brazing material layer on each of opposite surfaces thereof and which has crest portions extending in the front-rear direction, trough portions extending in the front-rear direction, and connection portions connecting the crest portions and the trough portions—is disposed in each of the remaining air-passing clearances 14 such that the corrugated outer fin 16 extends over the front and rear refrigerant flow tubes 12, and is brazed to the front and rear refrigerant flow tubes 12 of the left-side and right-side pairs 13 which define the air-passing clearance 14. That is, the outer fin 16 is disposed in each of the air-passing clearances 14 located on both sides of the air-passing clearance 14 in which the cool storage material container 15 is disposed. Also, the outer fin 16, which is formed from an aluminum brazing sheet having a brazing material layer on each of opposite surfaces thereof, is disposed on the outer side of the pair 13 of the refrigerant flow tubes 12 located at the left end, and is disposed on the outer side of the pair 13 of the refrigerant flow tubes 12 located at the right end. These outer fins 16 are brazed to the corresponding front and rear refrigerant flow tubes 12. Furthermore, a side plate 17 formed of aluminum is disposed on the outer side of each of the outer fins 16 located at the left and right ends, respectively, and is brazed to the corresponding outer fin 16. The spaces between the outer fins 16 and the side plates 17 located at the left and right ends also serve as air-passing clearances.

As shown in FIGS. 2 to 5, each cool storage material container 15 is a flat container whose longitudinal direction coincides with the vertical direction and whose width direction coincides with the front-rear direction. A corrugated inner fin 18 made of aluminum is disposed in the cool storage material container 15. The inner fin 18 has crest portions extending in the front-rear direction, trough portions extending in the front-rear direction, and connection portions connecting the crest portions and the trough portions. The trough portions and crest portions of the inner fin 18 are brazed to the left and right side walls 15a of the container body portion 15. For example, a paraffin-based latent heat storage material having an adjusted freezing point of about 5 to 10° C. is used as a cool storage material charged into the cool storage material container 15. Specifically, pentadecane, tetradecane, or the like is used.

A plurality of convex portions 19 which bulge outward are formed on each of the left and right side walls 15a of each cool storage material container 15 such that each side wall is studded with the convex portions 19. The flat bulging top walls of the convex portions 19 are brazed to the corresponding refrigerant flow tubes 12 in a state in which the bulging top walls are in contact with the refrigerant flow tubes 12. The inner fin 18 is brazed to portions of the left and right side walls 15a where the convex portions 19 are not formed. Although the bulging top walls of the convex portions 19 are in contact with the refrigerant flow tubes 12, they are not in contact with the inner fin 18. Accordingly, each of the left and right side walls 15a of each cool storage material container 15 has contact portions 21 which are in contact with the inner fin 18 and noncontact portions 22 which are not in contact with the inner fin 18. Namely, as viewed from the left side or the right side, portions of the left and right side walls 15a of each cool storage material container 15 where the convex portions 19 are not formed are the contact portions 21 which are in contact with the inner fin 18, and portions of the left and right side walls 15a which correspond to the bulging top walls of the convex portions 19 are the noncontact portions 22 which are not in contact with the inner fin 18. At least some of the convex portions 19 of one side wall 15a of each cool storage material container 15 are shifted from the corresponding convex portions 19 of the other side wall 15a thereof as viewed from the left side or the right side. Also, in an overlap region where the left and right side walls 15a of each cool storage material container 15 overlap with the corresponding refrigerant flow tubes 12 when the cool storage material container 15 is viewed from the left side or right side thereof, the total area of the contact portions 21 of each of the left and right side walls 15a of each cool storage material container 15, which portions are in contact with the inner fin 18, is greater than the total area of the noncontact portions 22 thereof which are not in contact with the inner fin 18.

Figure 4:
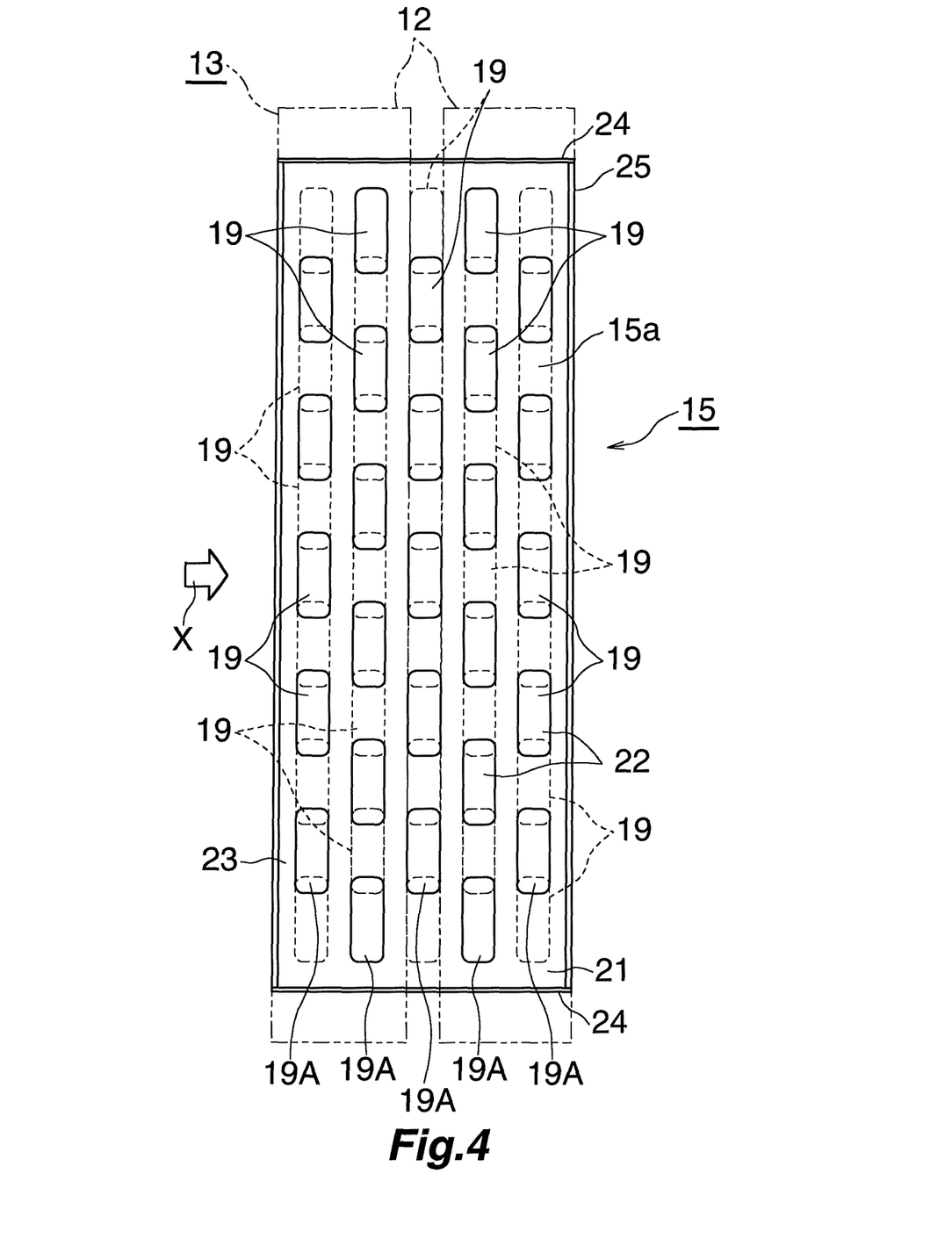
FIG. 4 is a right side view of a cool storage material container of the evaporator with a cool storage function of FIG. 1.

As viewed from the left side or the right side, the convex portions 19 have the shape of a rectangle elongated in the vertical direction. A plurality (5 in the present embodiment) of convex portion rows 19A each including a plurality of convex portions 19 spaced from one another in the vertical direction are provided such that the convex portion rows 19A are spaced from one another in the front-rear direction. On each of the left and right side walls 15a, the convex portions 19 in one of two convex portion rows 19A adjacent to each other in the front-rear direction are almost completely shifted in the vertical direction from the convex portions 19 in the other of the two convex portion rows 19A, although upper and lower end portions of the convex portions 19 in the one convex portion row 19A positionally overlap with upper and lower end portions of the convex portions 19 in the other convex portion row 19A. Also, the convex portions 19 in a convex portion row 19A on the left side wall 15a located at a certain position with respect to the front-rear direction are almost completely shifted in the vertical direction from the convex portions 19 in a convex portion row 19A on the right side wall 15a located at the same position as the certain position, although upper and lower end portions of the convex portions 19 in the convex portion row 19A on the left side wall 15a positionally overlap with upper and lower end portions of the convex portions 19 in the convex portion row 19A on the right side wall 15a. The convex portions 19 of two (front and rear) convex portion rows 19A are brazed to the front refrigerant flow tube 12, and the convex portions 19 of two (front and rear) convex portion rows 19A are brazed to the rear refrigerant flow tube 12. The vertical positions of the convex portions 19 in the front convex portion row 19A of the two convex portion rows 19A on one side wall 15a of a single cool storage material container 15, which rows are brazed to a certain refrigerant flow tube 12, are the same as those of the convex portions 19 in the rear convex portion row 19A of the two convex portion rows 19A on the other side wall 15a, which rows are brazed to a refrigerant flow tube 12 located on the same side as the certain flow tube 12 with respect to the front-rear direction. Similarly, the vertical positions of the convex portions 19 in the rear convex portion row 19A of the two convex portion rows 19A on the one side wall 15a, which rows are brazed to the certain refrigerant flow tube 12, are the same as those of the convex portions 19 in the front convex portion row 19A of the two convex portion rows 19A on the other side wall 15a, which rows are brazed to the refrigerant flow tube 12 located on the same side as the certain flow tube 12 with respect to the front-rear direction. As a result, as viewed from the left side or right side, some convex portions 19 on one side wall 15a of each cool storage material container 15 are sifted from the corresponding convex portions 19 on the other side wall 15a of the cool storage material container 15.

Figure 5:
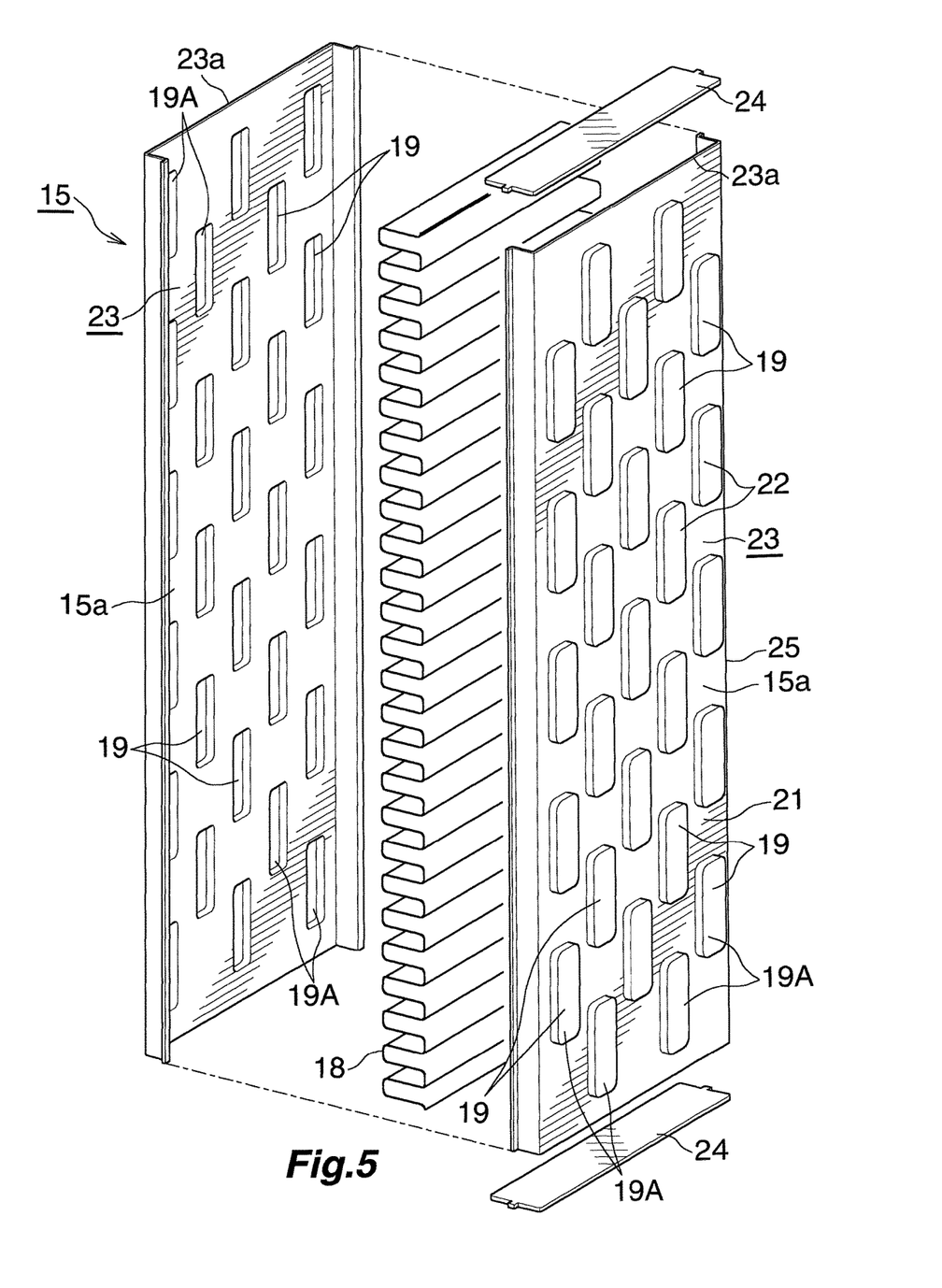
FIG. 5 is an exploded perspective view of the cool storage material container of the evaporator with a cool storage function of FIG. 1.

Each cool storage material container 15 is composed of left and right side plates 23, each of which is formed, through press work, from an aluminum brazing sheet having a brazing material layer on each of opposite sides thereof, and whose front and rear side edge portions are brazed together along the enter length, and upper and lower end closing plates 24, each of which is formed, through press work, from an aluminum brazing sheet having a brazing material layer on each of opposite sides thereof, and which are brazed to the upper and lower ends of the left and right side plates 23. Outward bulging portions 23a, which extend in the vertical direction and bulge outward with respect to the left-right direction, are formed on portions of the left and right side plates 23 excluding the front and rear side edge portions brazed together. Thus, a cool-storage-material charging space 25 is formed between the left and right side plates 23. The cool-storage-material charging space 25 extends in the vertical direction, and is opened at the upper and lower ends thereof. The upper and lower end openings of the cool-storage-material charging space 25 are closed by the closing plates 24.

The above-described evaporator 1 with a cool storage function constitutes a refrigeration cycle in combination with a compressor driven by an engine of a vehicle, a condenser (refrigerant cooler) for cooling the refrigerant discharged from the compressor, and an expansion valve (pressure-reducing unit) for reducing the pressure of the refrigerant having passed through the condenser. The refrigeration cycle is installed, as a car air conditioner, in a vehicle, such as an automobile, which temporarily stops the engine, which serves as a drive source of the compressor, when the vehicle is stopped. In the case of such a car air conditioner, when the compressor is operating, low pressure, two-phase refrigerant (a mixture of vapor refrigerant and liquid refrigerant) having been compressed by the compressor and having passed through the condenser and the expansion valve passes through the refrigerant inlet 7, and enters the leeward upper header section 5 of the evaporator 1. The refrigerant then passes through all the front refrigerant flow tubes 12, and flows out from the refrigerant outlet 8 of the windward upper header section 6. When the refrigerant flows through the refrigerant flow tubes 12, the refrigerant performs heat exchange with air passing through the air-passing clearances 14, and flows out in a vapor phase.

At that time, the cool carried by the refrigerant flowing through the refrigerant flow tubes 12 is transferred directly to the cool storage material within each cool storage material container 15 from the bulging top walls of the convex portions 19 of the two side walls 15a of the cool storage material container 15, the bulging top walls being brazed to the corresponding refrigerant flow tubes 12. Also, the cool carried by the refrigerant is transferred from the bulging top walls of the convex portions 19 to the cool storage material within the cool storage material container 15 via the contact portions 21 and the inner fin 18. Thus, cool is stored in the cool storage material.

When the compressor stops, the cool stored in the cool storage material within each cool storage material container 15 is transferred directly to the refrigerant flow tubes 12 from the bulging top walls of the convex portions 19 of the two side walls 15a of the cool storage material container 15, the bulging top walls being brazed to the refrigerant flow tubes 12, and is also transfer to the refrigerant flow tubes 12 via the inner fin 18, the contact portions 21, and the bulging top walls of the convex portions 19. The cool then passes through the refrigerant flow tubes 12 and propagates to the outer fins 16 brazed to the refrigerant flow tubes 12. Subsequently, the cool is transferred via the outer fins 16 to air passing through the air-passing clearances 14 adjacently located on the opposite sides of the air-passing clearance 14 in which the cool storage material container 15 is disposed. Accordingly, even when the temperature of air having passed through the evaporator 1 increases, the air is cooled, so that a sharp drop in the cooling capacity can be prevented.

FIGS. 6 to 9 show modifications of the cool storage material container.

Figure 6:
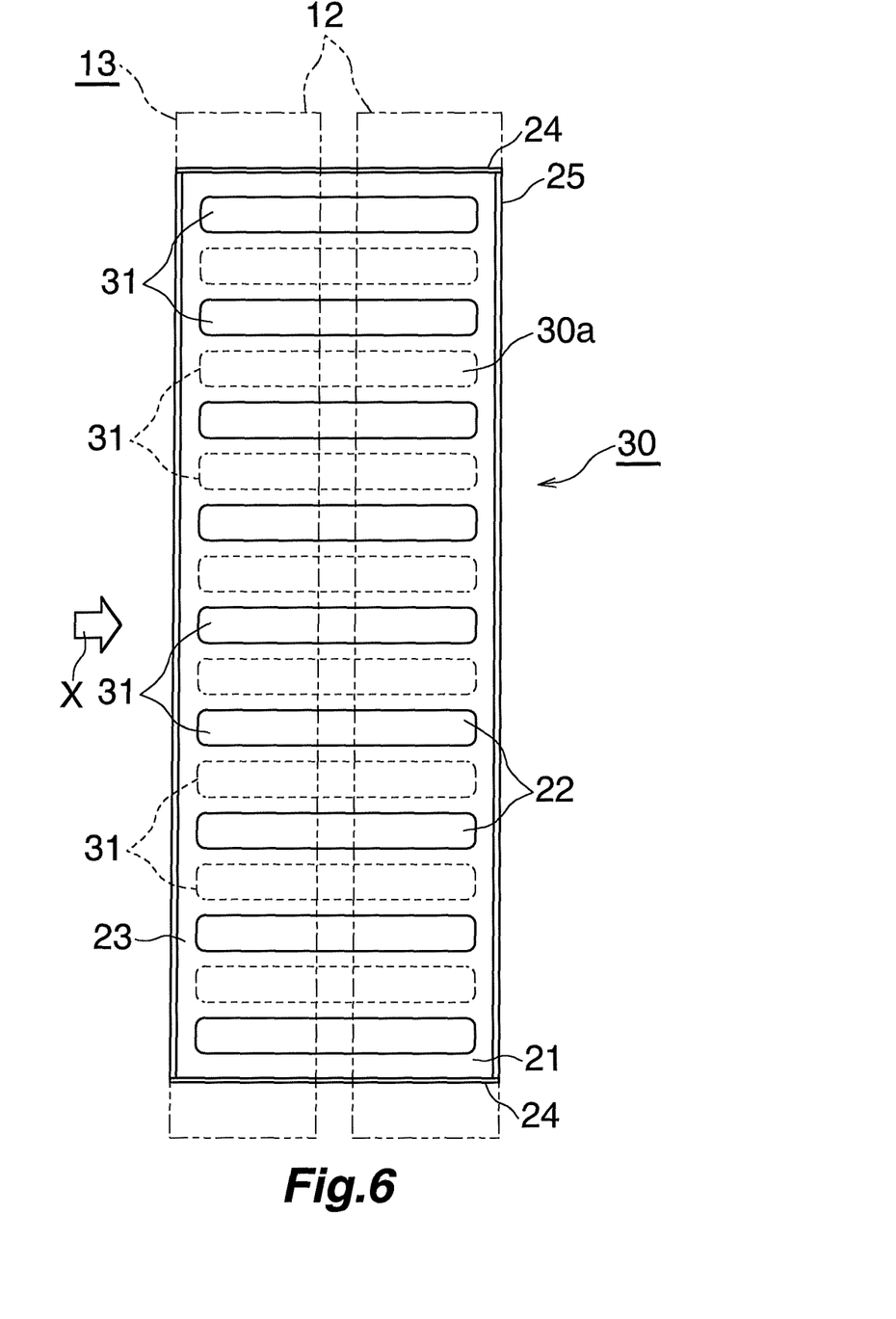
FIG. 6 is a view corresponding to FIG. 4 and showing a first modification of the cool storage material container.

In the case of a cool storage material container 30 shown in FIG. 6, a plurality of convex portions 31 which bulge outward and which have flat bulging top walls are formed on each of the left and right side walls 30a of the cool storage material container 30 such that the convex portions 31 are spaced from one another in the vertical direction. The cool storage material container 30 is brazed to the corresponding refrigerant flow tubes 12 in a state in which the flat bulging top walls of the convex portions 31 are in contact with the refrigerant flow tubes 12. The inner fin 18 is brazed to portions of the left and right side walls 30a where the convex portions 31 are not formed. Although the bulging top walls of the convex portions 31 are in contact with the refrigerant flow tubes 12, they are not in contact with the inner fin 18. Accordingly, each of the left and right side walls 30a of each cool storage material container 30 has contact portions 21 which are in contact with the inner fin 18 and noncontact portions 22 which are not in contact with the inner fin 18. Namely, as viewed from the left side or the right side, portions of the left and right side walls 30a of each cool storage material container 30 where the convex portions 31 are not formed are the contact portions 21 which are in contact with the inner fin 18, and portions of the left and right side walls 30a which correspond to the bulging top walls of the convex portions 31 are the noncontact portions 22 which are not in contact with the inner fin 18. At least some of the convex portions 31 of one side wall 30a of each cool storage material container 30 are shifted from the corresponding convex portions 31 of the other side wall 30a thereof as viewed from the left side or the right side. Also, in an overlap region where the left and right side walls 30a of each cool storage material container 30 overlap with the corresponding refrigerant flow tubes 12 when the cool storage material container 30 is viewed from the left side or right side thereof, the total area of the contact portions 21 of each of the left and right side walls 30a of the cool storage material container 30, which portions are in contact with the inner fin 18, is greater than the total area of the noncontact portions 22 thereof which are not in contact with the inner fin 18.

As viewed from the left side or the right side, each of the convex portions 31 has the shape of a rectangle elongated in the front-rear direction, and its front portion is brazed to the corresponding front refrigerant flow tube 12 and its rear portion is brazed to the corresponding rear refrigerant flow tube 12. The convex portions 31 of the left side wall 30a of the cool storage material container 30 are completely shifted from the convex portions 31 of the right side wall 30*a* thereof in the vertical direction. As a result, as viewed from the left side or the right side, some convex portions 31 of one side wall 30*a* of the cool storage material container 30 are shifted from the corresponding convex portions 31 of the other side wall 30*a* thereof.

The remaining structure of the cool storage material container 30 is identical with that of the cool storage material container 15 of the above-described embodiment.

Figure 7:
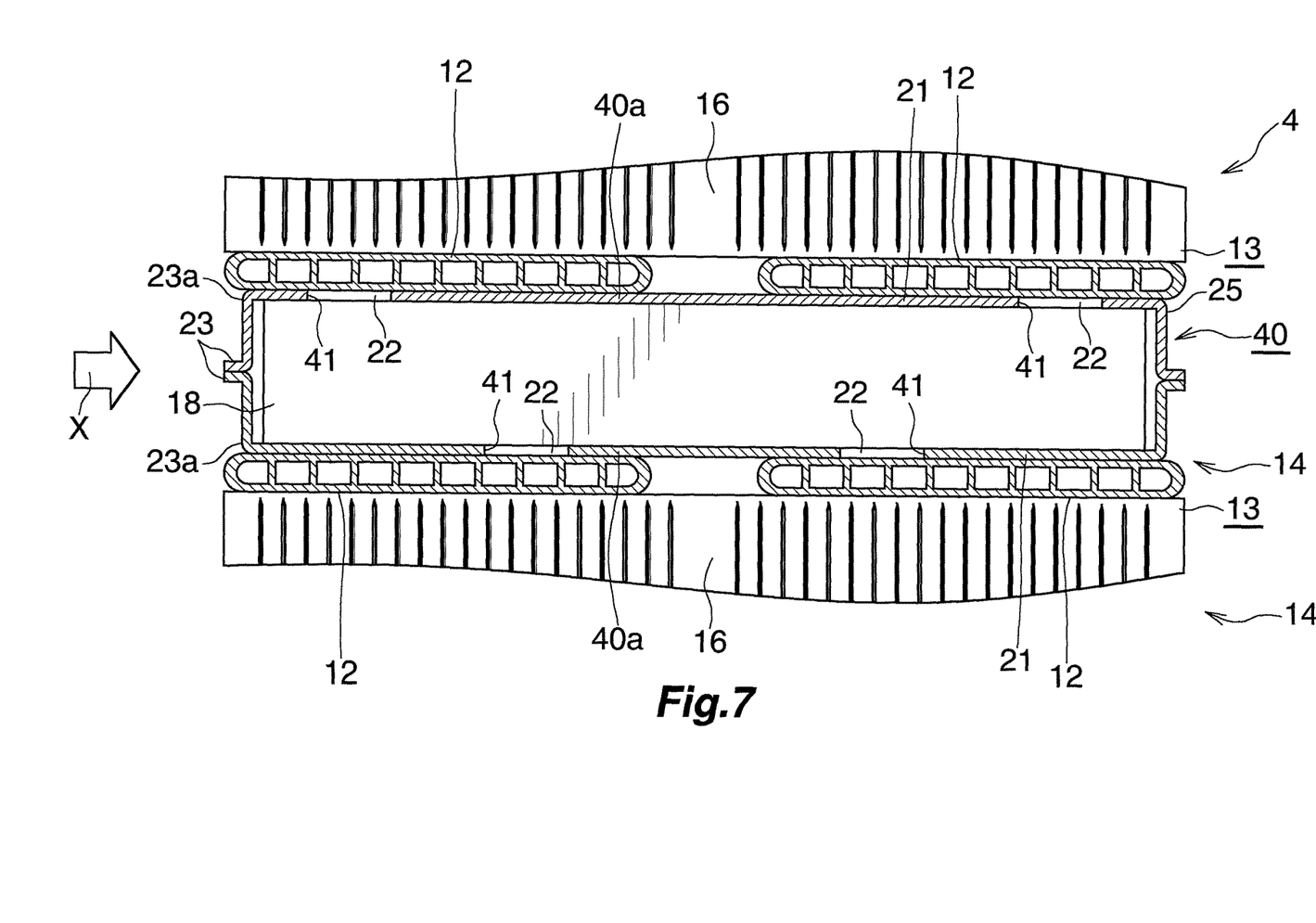
FIG. 7 is a view corresponding to FIG. 2 and showing a second modification of the cool storage material container.
Figure 9:
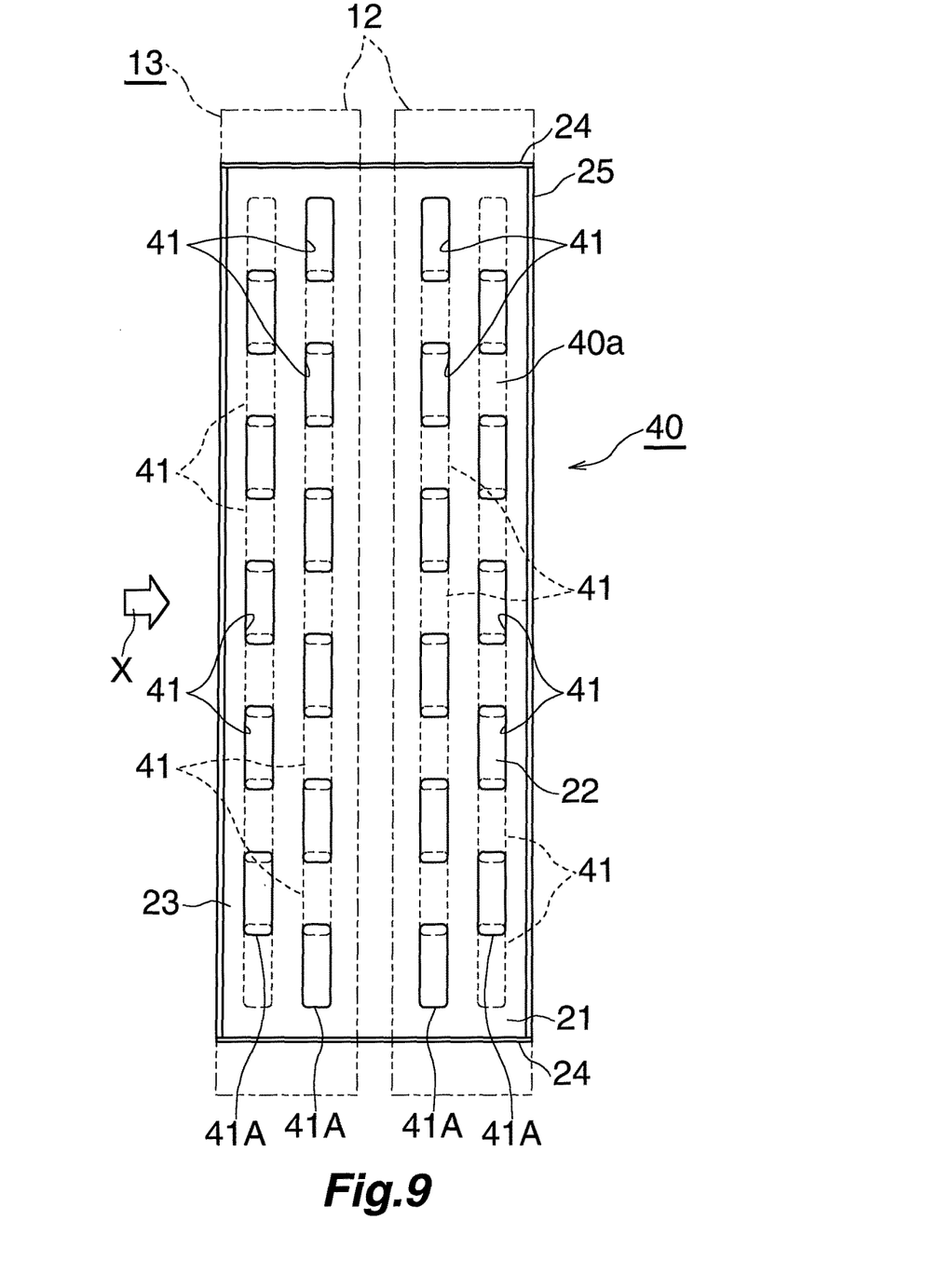
FIG. 9 is a view corresponding to FIG. 4 and showing the cool storage material container of FIG. 7.

In the case of a cool storage material container 40 shown in FIGS. 7 to 9, front portions and rear portions of opposite side walls 40*a* of the cool storage material container 40 are brazed to front and rear refrigerant flow tubes 12, respectively. A plurality of through-holes 41 are formed in portions of the left and right side walls 40*a* of the cool storage material container 40, which portions are brazed to the corresponding refrigerant flow tubes 12, such that the portions are studded with the through-holes 41. The inner fin 18 is brazed to portions of the left and right side walls 40*a* where the through-holes 41 are not formed. The portions of the left and right side walls 40*a* where the through-holes 41 are not formed are in contact with both the refrigerant flow tubes 12 and the inner fin 18. Also, the portions of the left and right side walls 40*a* where the through-holes 41 are formed are in contact with neither the refrigerant flow tubes 12 nor the inner fin 18. Accordingly, each of the left and right side walls 40*a* of the cool storage material container 40 has contact portions 21 which are in contact with the inner fin 18 and noncontact portions 22 which are not in contact with the inner fin 18. Namely, as viewed from the left side or the right side, the portions of the left and right side walls 40*a* of the cool storage material container 40 where the through-holes 41 are not formed are the contact portions 21 which are in contact with the inner fin 18, and the portions of the left and right side walls 40*a* which correspond to the through-holes 41 are the noncontact portions 22 which are not in contact with the inner fin 18. At least some of the through-holes 41 of one side wall 40*a* of the cool storage material container 40 are shifted from the corresponding through-holes 41 of the other side wall 40*a* thereof as viewed from the left side or the right side. Also, in an overlap region where the left and right side walls 40*a* of the cool storage material container 40 overlap with the corresponding refrigerant flow tubes 12 when the cool storage material container 40 is viewed from the left side or right side thereof, the total area of the contact portions 21 of each of the left and right side walls 40*a* of the cool storage material container 40, which portions are in contact with the inner fin 18, is greater than the total area of the noncontact portions 22 thereof which are not in contact with the inner fin 18.

As viewed from the left side or the right side, each of the through-holes 41 has the shape of a rectangle elongated in the vertical direction. A plurality (4 in the present embodiment) of hole rows 41A each including a plurality of through-holes 41 spaced from one another in the vertical direction are provided such that the hole rows 41A are spaced from one another in the front-rear direction. On each of the left and right side walls 40*a*, the through-holes 41 in one of two hole rows 41A adjacent to each other in the front-rear direction are almost completely shifted in the vertical direction from the through-holes 41 in the other of the two hole rows 41A, although upper and lower end portions of the through-holes 41 in the one hole row 41A positionally overlap with upper and lower end portions of the through-holes 41 in the other hole row 41A. Also, the through-holes 41 in a hole row 41A on the left side wall 40*a* located at a certain position with respect to the front-rear direction are almost completely shifted in the vertical direction from the through-holes 41 in a hole row 41A on the right side wall 40*a* located at the same position as the certain position, although upper and lower end portions of the through-holes 41 in the hole row 41A on the left side wall 40*a* positionally overlap with upper and lower end portions of the through-holes 41 in the hole row 41A on the right side wall 40*a*. Portions of the left and right side walls 40*a* of the cool storage material container 40 where the through-holes 41 of two (front and rear) hole rows 41A are formed are brazed to the corresponding front refrigerant flow tubes 12, and portions of the left and right side walls 40*a* of the cool storage material container 40 where the through-holes 41 of two (front and rear) hole rows 41A are formed are brazed to the corresponding rear refrigerant flow tubes 12. The vertical positions of the through-holes 41 in the front hole row 41A of the two hole rows 41A formed in the portion of one side wall 40*a* of a single cool storage material container 40, which portion is brazed to a certain refrigerant flow tube 12, are the same as those of the through-holes 41 in the rear hole row 41A of the two hole rows 41A formed in the portion of the other side wall 40*a*, which portion is brazed to a refrigerant flow tube 12 located on the same side as the certain flow tube 12 with respect to the front-rear direction. Similarly, the vertical positions of the through-holes 41 in the rear hole row 41A of the two hole rows 41A formed in the portion of one side wall 40*a* of the cool storage material container 40, which portion is brazed to the certain refrigerant flow tube 12, are the same as those of the through-holes 41 in the front hole row 41A of the two hole rows 41A formed in the portion of the other side wall 40*a*, which portion is brazed to the refrigerant flow tube 12 located on the same side as the certain flow tube 12 with respect to the front-rear direction. As a result, as viewed from the left side or right side, some through-holes 41 of one side wall 40*a* of the cool storage material container 40 are sifted from the corresponding through-holes 41 of the other side wall 40*a* of the cool storage material container 40.

The remaining structure of the cool storage material container 40 is identical with that of the cool storage material container 15 of the above-described embodiment.

Figure 10:
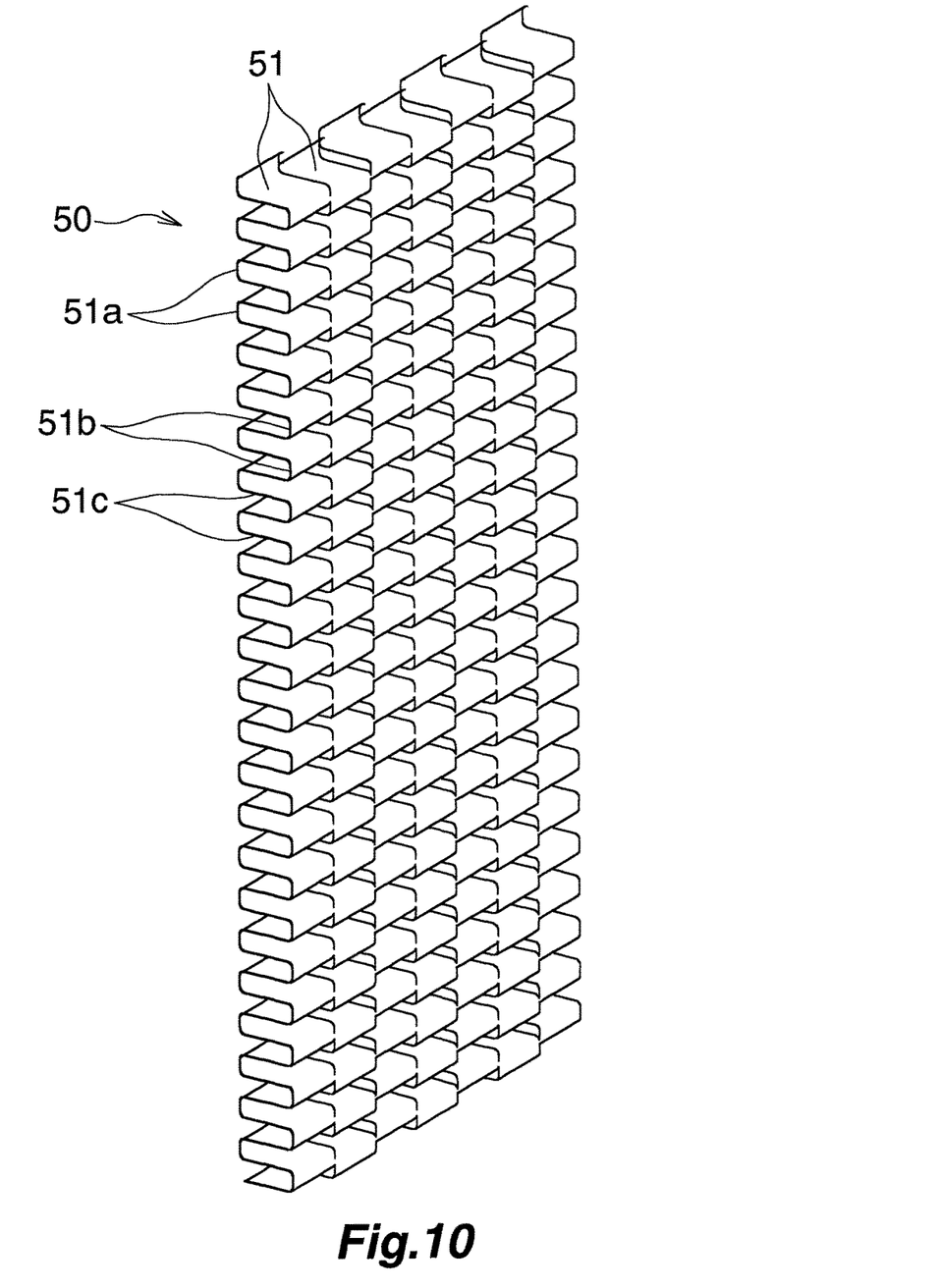
FIG. 10 is a perspective view showing a modification of the inner fin.

FIG. 10 shows a modification of the inner fin.

An inner fin 50 shown in FIG. 10 is formed from aluminum into an offset shape. The inner fin 50 is composed of a plurality of corrugated strips 51, each of which has crest portions 51*a* extending in the front-rear direction (air-passing direction), trough portions 51*b* extending in the front-rear direction, and connection portions 51*c* connecting the crest portion 51*a* and the trough portion 51*b*. The corrugated strips 51 are arranged in the air-passing direction and integrally connected with one another such that the crest portions 51*a* and the trough portions 51*b* of one of two strips 51 adjacent to each other in the front-rear direction are positionally shifted in the vertical direction from those of the other of the two strips 51. The crest portions 51*a* and the trough portions 51*b* of the strips 51 of the inner fin 50 are brazed to the left and right side walls of the cool storage material container.

What is claimed is:

1. An evaporator with a cool storage function, comprising:
    refrigerant flow tubes disposed substantially in parallel with each other in an arranging direction and spaced from one another with air-passing clearances therebetween in the arranging direction, the refrigerant flow tubes including a first refrigerant flow tube and a second refrigerant flow tube juxtaposed to the first refrigerant flow tube in the arranging direction, the first refrigerant flow tube and the second refrigerant flow tube defining at least one of the air-passing clearances; and at least one cool storage material container containing a cool storage material therein and disposed in the at least one of the air-passing clearances, the at least one cool storage material container comprising:

an inner fin provided in the at least one cool storage material container;

a first side wall provided opposite to the first refrigerant flow tube in the arranging direction and having first convex portions which project toward the first refrigerant flow tube and whose outer surfaces contact the first refrigerant flow tube, the inner fin being in contact with a first inner surface of the first side wall at first contact portions and being not in contact with the first inner surface at first noncontact portions including the first convex portions;

a second side wall provided opposite to the second refrigerant flow tube in the arranging direction and having a second inner surface opposite to the first inner surface of the first side wall in the arranging direction, the second side wall having second convex portions which project toward the second refrigerant flow tube and whose outer surfaces contact the second refrigerant flow tube, the inner fin being in contact with the second inner surface of the second side wall at second contact portions and being not in contact with the second inner surface at second noncontact portions including the second convex portions; and the first convex portions on the first side wall being asymmetrical with the second convex portions on the second side wall with respect to a plane at a center between the first side wall and the second side wall and perpendicular to the arranging direction such that a first one of the first convex portions on the first side wall partially overlaps a first one of the second convex portions on the second side wall in the arranging direction.

2. The evaporator with a cool storage function according to claim 1, wherein the plurality of noncontact portions are formed by a plurality of outwardly bulging convex portions that are formed on each of the left and right side walls of the cool storage material container such that each of the side walls is studded with the convex portions, and bulging top walls of the convex portions are in contact with the corresponding refrigerant flow tubes; and as viewed from the left side or right side of the cool storage material container, portions of each of the left and right side walls of the cool storage material container where the convex portions are not formed serve as the contact portion which is in contact with the inner fin, and portions of each of the left and right side walls which correspond to the bulging top walls of the convex portions serve as the plurality of noncontact portions which is not in contact with the inner fin.

3. The evaporator with a cool storage function according to claim 2, wherein at least some of the convex portions of one side wall of the cool storage material container are shifted from the corresponding convex portions of the other side wall of the cool storage material container as viewed from the left side or right side of the cool storage material container.

4. The evaporator with a cool storage function according to claim 1, wherein the inner fin has an offset shape, and is formed by a plurality of corrugated strips which are arranged in the air-passing direction and integrally connected together, each of the corrugated strips having crest portions extending in the air-passing direction, trough portions extending in the air-passing direction, and connection portions connecting the crest portion and the trough portion; and the crest portions and the trough portions of one of two strips adjacent to each other in the air-passing direction are positionally shifted in the vertical direction from those of the other strip.

5. The evaporator with a cool storage function according to claim 1, wherein the inner fin has a corrugated shape, and has crest portions extending in the air-passing direction, trough portions extending in the air-passing direction, and connection portions connecting the crest portion and the trough portion.

6. The evaporator with a cool storage function according to claim 1, wherein outer fins are disposed in air-passing clearances adjacent to the air-passing clearance in which the cool storage material container is disposed.

7. The evaporator with a cool storage function according to claim 1, wherein the noncontact portions on the left side wall overlap with the contact portions on the right side wall when the cool storage material container is viewed from the left side or right side thereof, and wherein the noncontact portions on the right side wall overlap with the contact portions on the left side wall when the cool storage material container is viewed from the left side or right side thereof.

8. The evaporator with a cool storage function according to claim 1, wherein the first one of the first convex portions extends beyond an upper edge of a corresponding first contact portion and beyond a lower edge of the corresponding first contact portion in a direction orthogonal to the arranging direction.

9. The evaporator with a cool storage function according to claim 1, wherein a first row of the first convex portions does not overlap a first row of the second convex portions, the first row of the first convex portions and the first row of the second convex portions being disposed at a same height of the first side wall and the second side wall.

* * * * *